T. C. HACKETT.
FLOAT CONTROLLED VALVE.
APPLICATION FILED FEB. 17, 1915.

1,178,396. Patented Apr. 4, 1916.

Witnesses
E. R. Ruppert.
C. C. Hines.

Inventor
T. C. Hackett
By Victor J. Evans
Attorney

UNITED STATES PATENT OFFICE.

THOMAS C. HACKETT, OF POMONA, CALIFORNIA.

FLOAT-CONTROLLED VALVE.

1,178,396.  Specification of Letters Patent.  Patented Apr. 4, 1916.

Application filed February 17, 1915. Serial No. 8,816.

*To all whom it may concern:*

Be it known that I, THOMAS C. HACKETT, a citizen of the United States, residing at Pomona, in the county of Los Angeles and State of California, have invented new and useful Improvements in Float - Controlled Valves, of which the following is a specification.

This invention relates to improvements in float controlled valves of that kind generally employed for governing the flow of water or other fluid to a tank or receptacle and maintaining a desired level of the liquid therein.

The primary object of the invention is to provide a valve of this character which is positive, reliable and efficient in action, and in which the valve when seated will be held closed both through the closing pressure of the float lever and also under the direct pressure of the water, thus insuring greater security against possibility of leakage.

A further object of the invention is to provide a valve which will work smoothly and easily, which is simple of construction and capable of being manufactured and installed at a comparatively low cost, and in which the valve member is adjustably connected with the float lever so as to provide for the accurate seating of the valve when the water reaches the predetermined level.

A still further object of the invention is to provide a construction of valve chamber and means for guarding the valve when in open position, whereby the valve will be relieved from any tendency of the water pressure to force it closed during the inrush of the water in the filling action.

The invention consists of the features of construction, combination and arrangement of parts herein fully described and claimed, reference being had to the accompanying drawing in which:—

Figure 1:
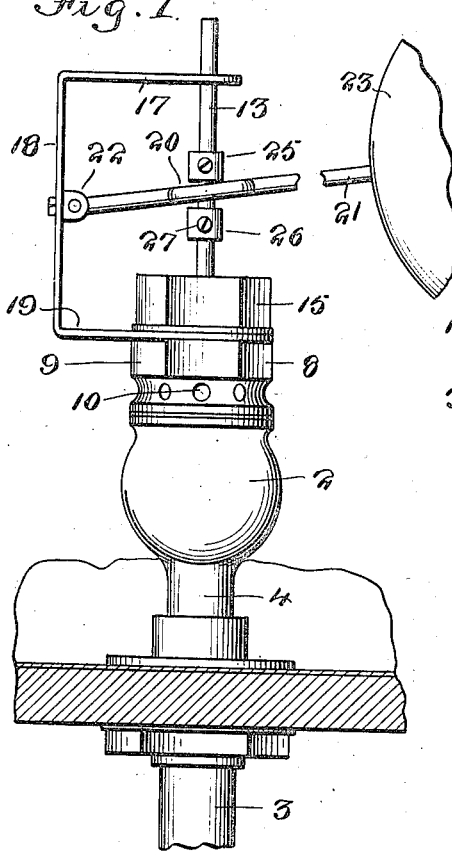
Figure 2:
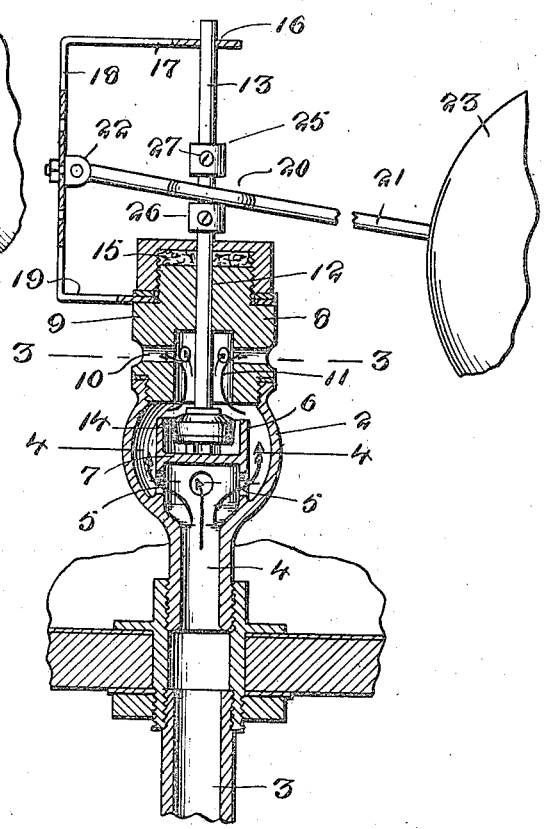
Figure 3:
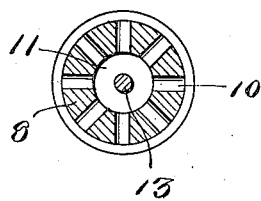
Figure 4:
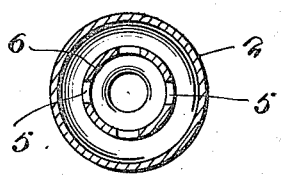

Figure 1 is a sectional view through a tank embodying my improved float controlled valve, the latter appearing in elevation and with the float lever in valve closing position. Fig. 2 is a vertical section through the tank and valve showing the valve and valve lever in the position they occupy when the valve is open. Figs. 3 and 4 are horizontal transverse sections on the lines 3—3 and 4—4 of Fig. 2.

Referring to the drawing, 1 designates a tank or other receptacle within which is arranged my improved valve mechanism, which comprises a water pressure and valve chamber 2, preferably of globular form, and communicating at its lower end with an inflow connection 3, adapted to be coupled to a supply pipe through which the liquid is conducted from a suitable source. This connection 3 may be integral with the base of the chamber 2 and communicates with the lower end of an inlet tube 4, which may also be integral with the chamber 2, and which extends upwardly into the chamber to a desired level and is provided with an annular series of water inlet passages 5. Carried by said tube 4 is a valve receiving chamber or cup 6 which is open at its upper end but is closed against communication with the tube by a wall or partition 7.

Communicating with the top of the chamber 2 is an outlet connection 8 provided with a cap or bonnet portion 9 and an annular series of water discharge passages 10. The lower portion of the said connection 8 is formed with a passage 11 leading to and through its base and communicating with the openings 10 and also with a relatively restricted passage 12 extending upwardly through the bonnet.

Fitted to slide vertically through the passage 9 is a valve stem 13 carrying at its lower end a valve 14, which stem works through a stuffing box 15 in or upon the bonnet and is also fitted to slide through a guide opening 16 in the upper arm 17 of a yoke-shaped bracket 18, the lower arm 19 of which is formed integral with or connected to the bonnet 9 so that the bracket will be supported from the outlet connection of the pressure and valve chamber. The valve is adapted on its upward movement to close the passages 11 and on its downward movement to uncover said passages and move to a point below the inlet connection and into the pocket 6. Between the arms 17 and 19 of the yoke 18 the valve extends loosely through an opening 20 in a float lever 21 which is pivoted at one end to the body of the yoke for vertical movement, as indicated at 22. The opposite end of the yoke carries a suitable float 23, by which the lever is forced downward by gravity when the water recedes in the tank and is forced upward by the pressure of the water as the latter rises in the tank. Disposed upon the valve stem 16 above and below the lever are stop collars 25 and 26 each adjustably secured in position by means of a set screw 27 and preferably at all times so spaced from the other collar as to permit the lever to have a certain degree of lost motion on its rising and falling movements, thus tending to prevent any oscillations of the valve due to fluctuations in the pressure of the acending or descending body of water. The collars are adapted to be secured in adjusted position by means of the set screws, so that the extent of lost motion of the lever may be varied, as will be readily understood. These adjustable stops also permit the lever to be adjusted with relation to the valve to effect an accurate closing of the valve at the moment the water in the tank reaches the predetermined maximum level.

It will be evident from the foregoing description that when the lever is elevated to its maximum degree by the pressure of the water when the latter reaches its maximum level, the valve will be raised to closed position to cut off the flow of water through the passage 11 and ports 10. In this position the valve is elevated wholly out of the cup 7 and its bottom surface is subjected to the pressure of the water in the chamber 2, so that it will be held open not only by the up-pull of the float lever but also by the direct pressure of the water. When on the other hand the valve is forced downward to open position it will pass below the outlet connection and fully into the cup 6 and thus open communication between the chamber 2 and tank for the inflow of water through the passage 11 and ports 10. The movement of the valve into the cup 6 insures the guarding of the valve against pressure from below while its upper surface is exposed to the action of pressure from above, so that the valve in addition to being held open by the float lever will also be held open by the direct pressure of the water. By reason of the construction and functions set forth it will be evident that a comparatively simple and inexpensive type of valve mechanism is provided, which is positive, reliable and accurate in action, which, for the reasons stated, is not liable to leak or to vibrate in its seating and unseating actions, so that a positive closing and unclosing action will be insured.

I claim:—

In a float valve mechanism, the combination with a water supply pipe, of a globular valve chamber having an inlet at its lower end communicating with said pipe and having its upper end open and internally threaded, a tubular projection from the lower portion of the globular body of said casing, extending upwardly into said casing and having a horizontal partition forming a lower admission compartment and an upper valve receiving cup, said admission compartment communicating with the interior of the casing below said cup, a cap threaded at its lower end into the open upper end of the casing and provided with a bore extending part-way up into the same and having an annular series of radial outlets leading laterally therefrom, the upper end of said cap having a reduced threaded projection, a gland nut carried by said projection, a bracket clamped by said nut to the cap, a valve stem movable vertically through the cap and gland nut and extending at its lower end into the casing and in guided connection at its upper end with said bracket, a float lever pivoted to the bracket and slidably and pivotally connected with the valve stem, and a valve carried by the lower end of said stem and movable between the lower end of the cap and the cup and downwardly into said cup.

In testimony whereof I affix my signature in presence of two witnesses.

THOMAS C. HACKETT.

Witnesses:
  ROBERT G. WILSON,
  A. L. HICKSON.